«12» United States Patent
Holten et al.

(10) Patent No.: US 10,045,657 B2
(45) Date of Patent: Aug. 14, 2018

(54) REPLACEABLE HEAT EXCHANGE CARTRIDGE EMPLOYED IN A HEAT EXCHANGE SYSTEM FOR TEMPERATURE CONTROL OF A PERISHABLE FLUID

(75) Inventors: Hendrikus Lodewijk Jozeph Franciscus Holten, Doesburg (NL); Arjen Patrick Huisman, Nijmegen (NL); Tonny Dreves, Lobith (NL); Petrus Johannes Maria van Bommel, Waalre (NL); Hendrikus Wilhelmus Maria van Santen, Gaanderen (NL)

(73) Assignee: EQUITEC HOLDING B.V., Duiven (NL)

( * ) Notice: Subject to any disclaimer, the term of this patent is extended or adjusted under 35 U.S.C. 154(b) by 802 days.

(21) Appl. No.: 14/118,508

(22) PCT Filed: May 16, 2012

(86) PCT No.: PCT/NL2012/050344
§ 371 (c)(1),
(2), (4) Date: Jan. 17, 2014

(87) PCT Pub. No.: WO2012/161571
PCT Pub. Date: Nov. 29, 2012

(65) Prior Publication Data
US 2014/0150991 A1    Jun. 5, 2014

(30) Foreign Application Priority Data

May 20, 2011  (NL) .................................. 2006826

(51) Int. Cl.
*F28F 7/00* (2006.01)
*A47J 31/54* (2006.01)
*F28G 5/00* (2006.01)

(52) U.S. Cl.
CPC ............. *A47J 31/54* (2013.01); *A47J 31/542* (2013.01); *F28G 5/00* (2013.01); *F28F 2255/02* (2013.01)

(58) Field of Classification Search
CPC .......... F28F 7/02; F28F 2280/06; F28F 9/001; F28F 2250/02; F28D 7/005; F28D 7/08;
(Continued)

(56) References Cited

U.S. PATENT DOCUMENTS 3,853,479 A * 12/1974 Talonn .................... A61M 5/44
                                                            128/DIG. 3
3,864,248 A *  2/1975 Granger .................. A61M 1/10
                                                            210/136
(Continued)

FOREIGN PATENT DOCUMENTS

DE          606028      11/1934
DE          273496      11/1989
(Continued)

OTHER PUBLICATIONS

Schade, DE-606028—English Machine Translation, Nov. 23, 1934.*
JP2002119586—English Machine Translation.*

*Primary Examiner* — Jianying Atkinson
*Assistant Examiner* — Jose O Class-Quinones
(74) *Attorney, Agent, or Firm* — Casimir Jones, SC; Robert A. Goetz

(57) ABSTRACT

A method for exchanging heat between a heat exchange fluid and a perishable product fluid. The method includes providing the heat exchange fluid to an enclosure 5 of a heat exchanger and provides the perishable product fluid to a tube 53 including a flexible portion in the enclosure 51. The method includes exchanging heat between the heat exchange fluid in the enclosure and the perishable product fluid in the tube 53 and interrupting providing the perishable product
(Continued)

fluid to the tube 53. The method further includes compressing the flexible portion of the tube 53 to decrease a volume of the tube 3 and to press a substantial part of the perishable product fluid out of the tube 53. The method may include changing the heat exchange fluid at a first temperature to a heat exchange fluid at a second temperature different than the first temperature.

18 Claims, 9 Drawing Sheets

(58) Field of Classification Search
CPC ... F28D 7/082; F28D 7/085; B65D 2081/001; B65D 81/34; B65D 85/72
USPC .................. 426/115, 109; 99/295, 300–322; 165/164, 46, 154
See application file for complete search history.

(56) References Cited

U.S. PATENT DOCUMENTS

| | | | |
|---|---|---|---|
| 4,177,816 A * | 12/1979 | Torgeson | A61F 7/00 138/38 |
| 4,253,385 A * | 3/1981 | Illy | A47J 31/3685 99/281 |
| 4,693,302 A | 9/1987 | Dodds | |
| 4,814,073 A * | 3/1989 | Shouldice | A61M 1/1656 210/321.69 |
| 4,908,014 A * | 3/1990 | Kroyer | A61M 1/369 128/DIG. 3 |
| 5,263,929 A * | 11/1993 | Falcone | A61M 5/445 126/263.07 |
| 5,403,281 A * | 4/1995 | O'Neill | A61M 5/44 165/156 |
| 5,702,358 A * | 12/1997 | Witherspoon | A61M 1/3664 128/DIG. 3 |
| 5,816,135 A | 10/1998 | Ferri | |
| 6,192,785 B1 * | 2/2001 | Trida | A47J 31/41 99/275 |
| 2008/0073064 A1 | 3/2008 | Gueguen | |

FOREIGN PATENT DOCUMENTS

| | | |
|---|---|---|
| DE | 202009010578 | 1/2011 |
| FR | 2544184 | 10/1984 |
| FR | 2874080 | 10/2006 |
| JP | 2002119586 A * | 4/2002 |
| WO | 08/139205 | 11/2008 |
| WO | 10/034097 | 4/2010 |

* cited by examiner

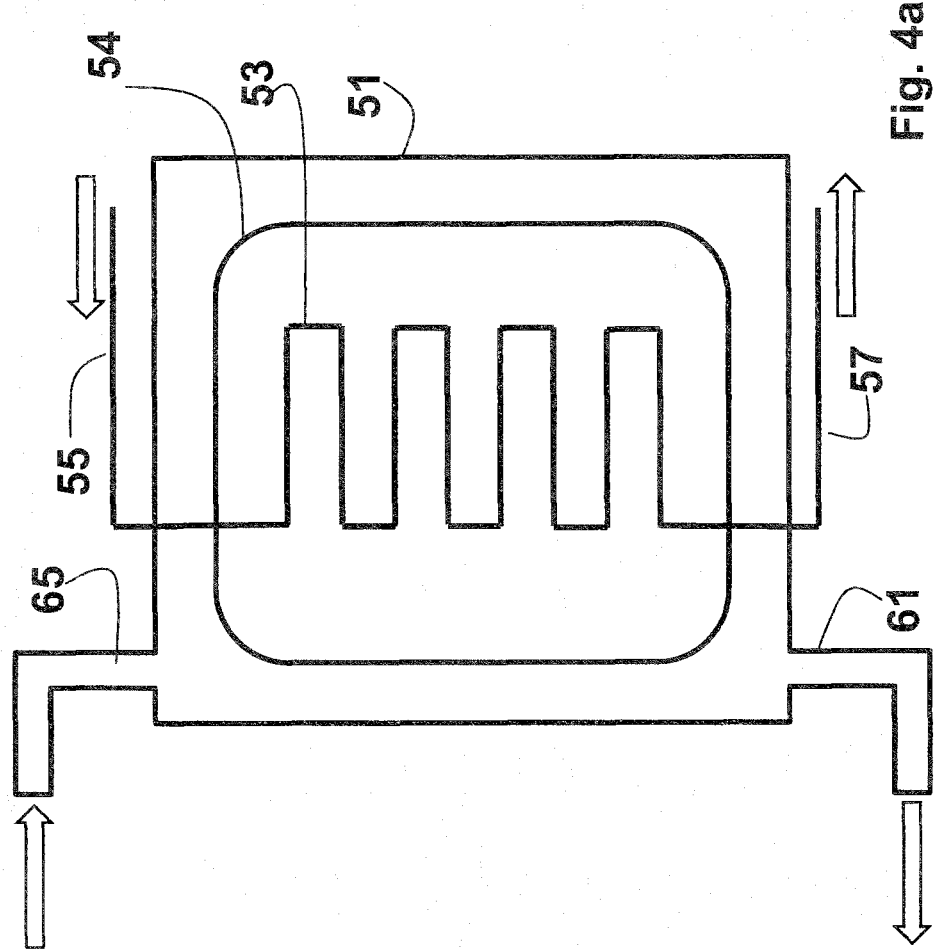

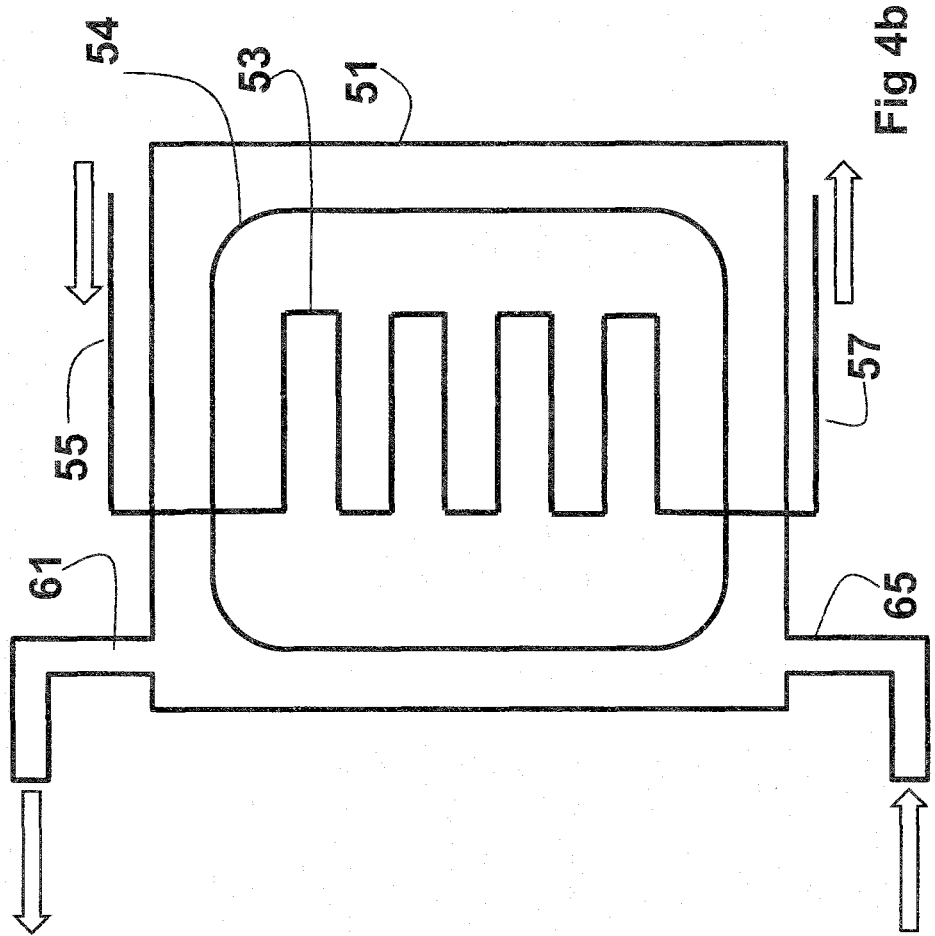

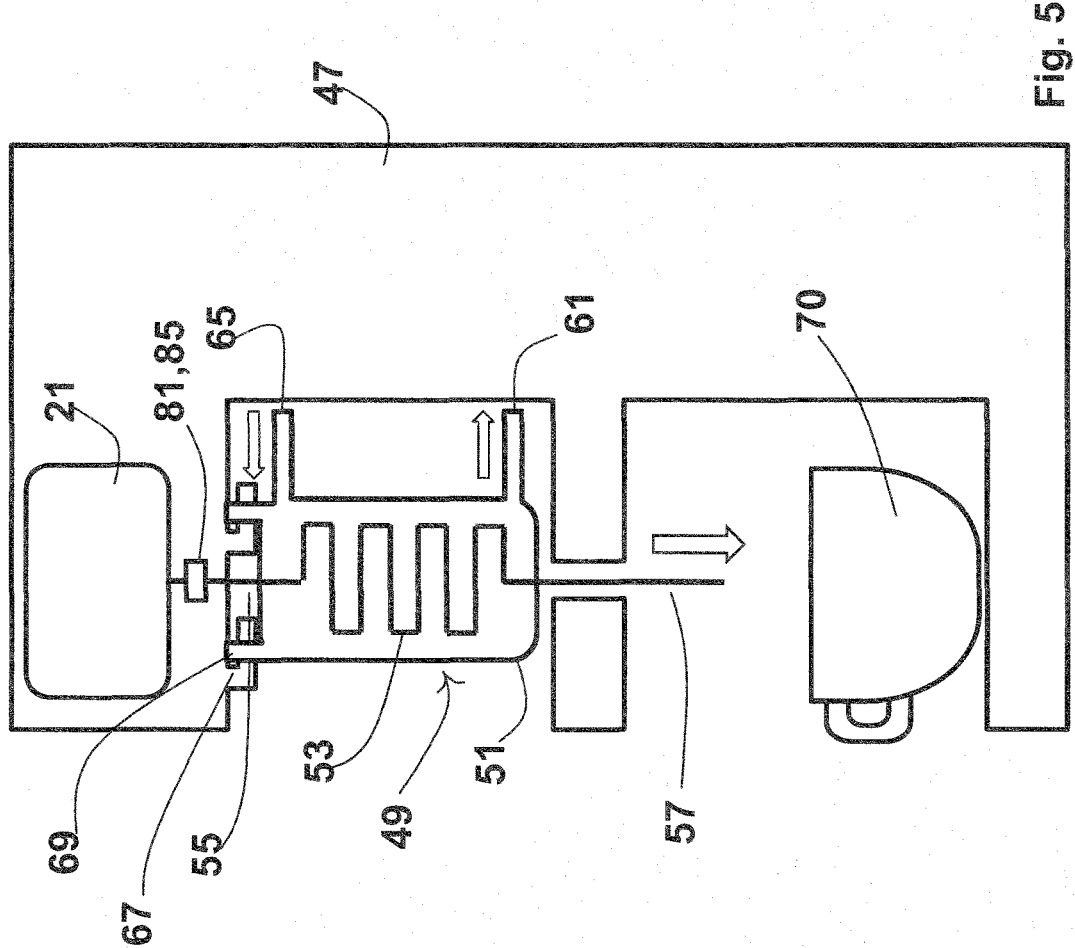

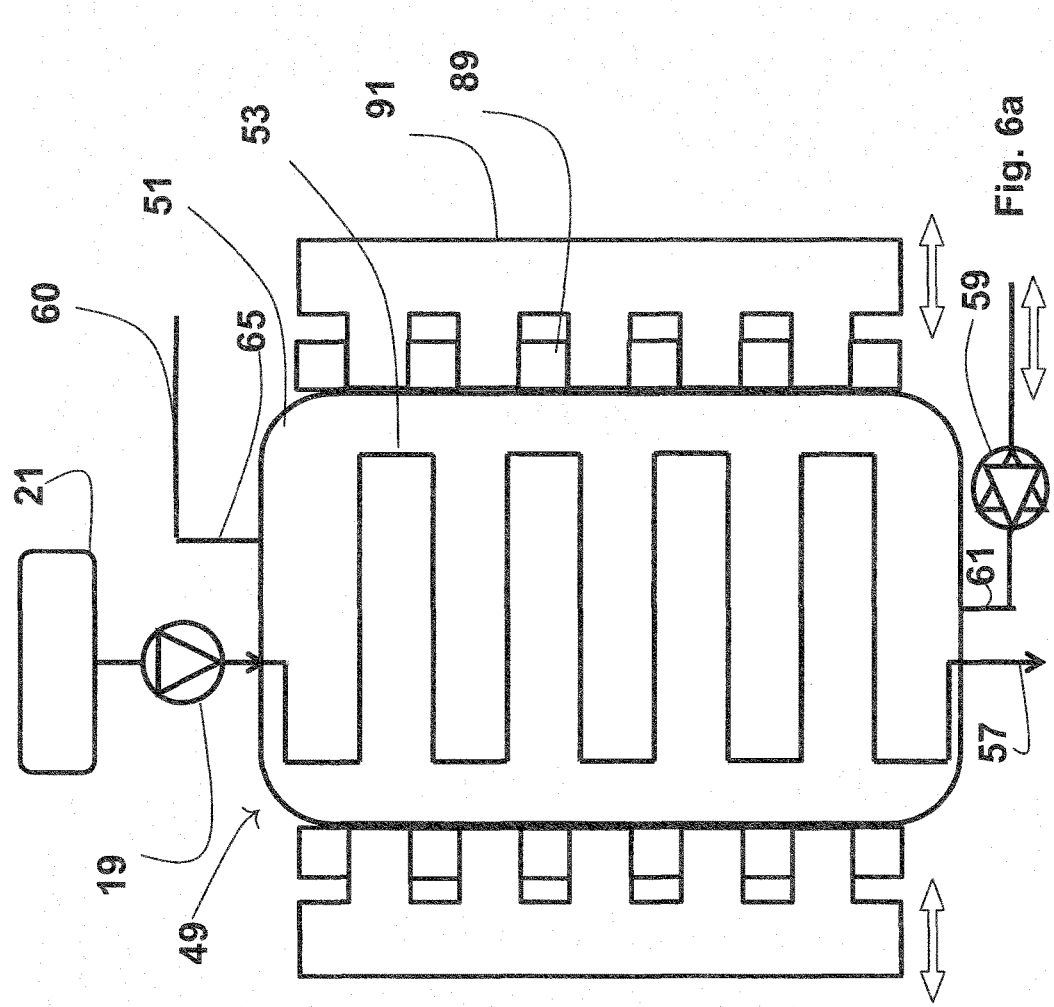

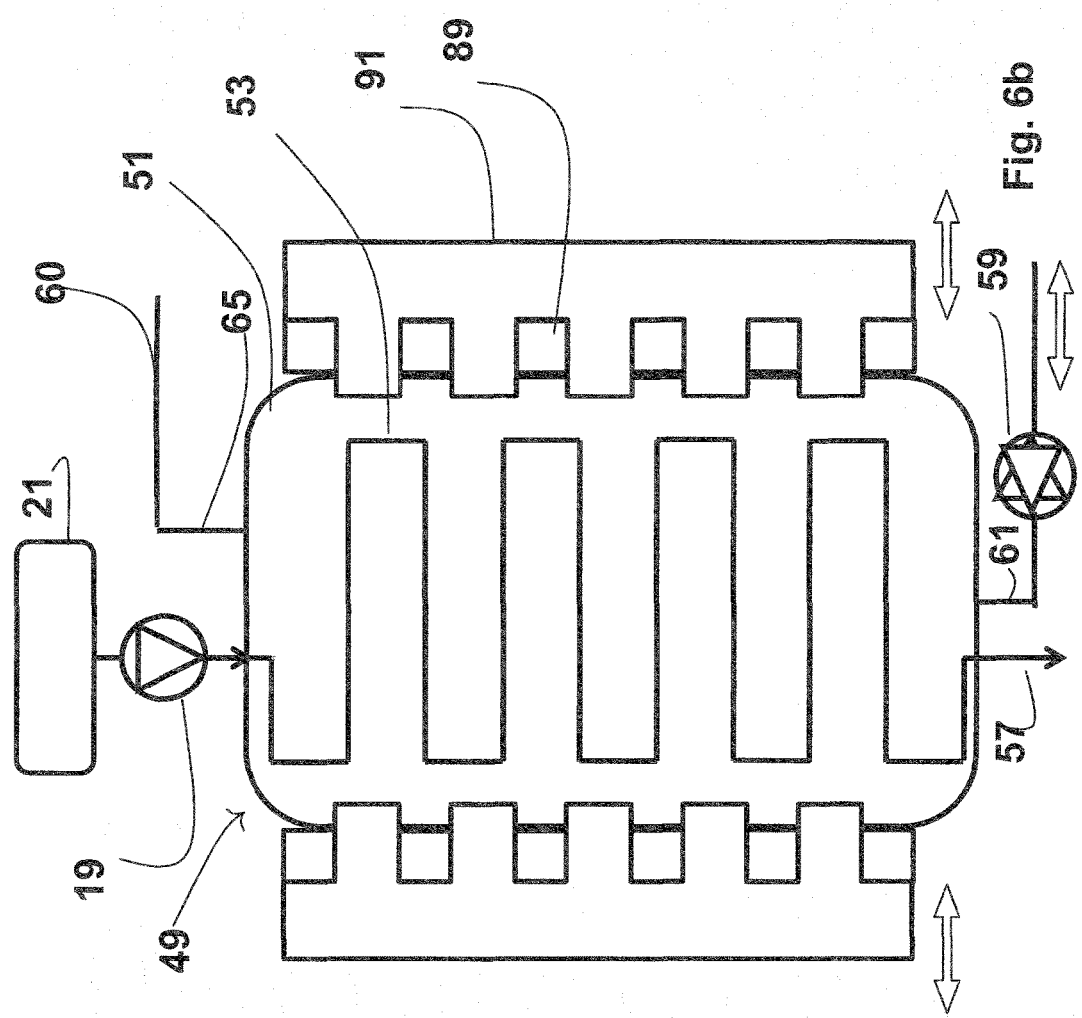

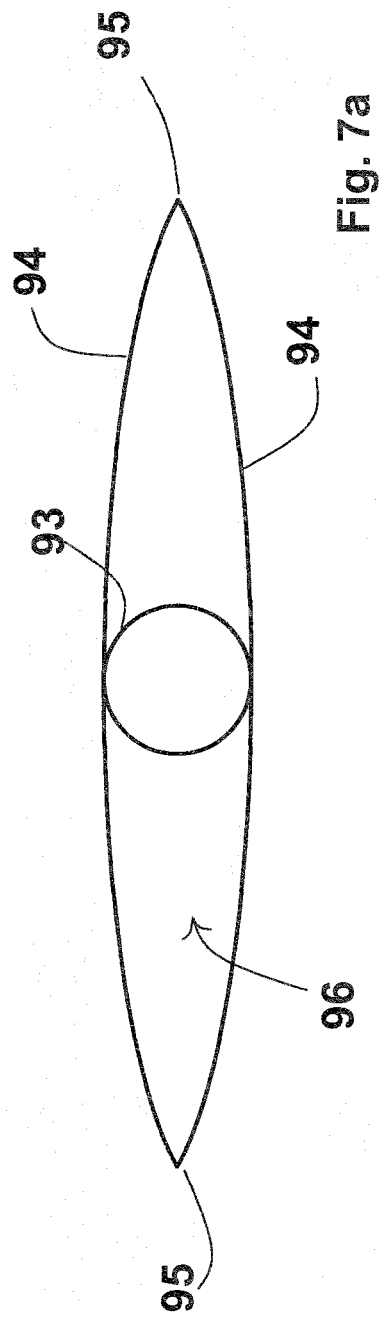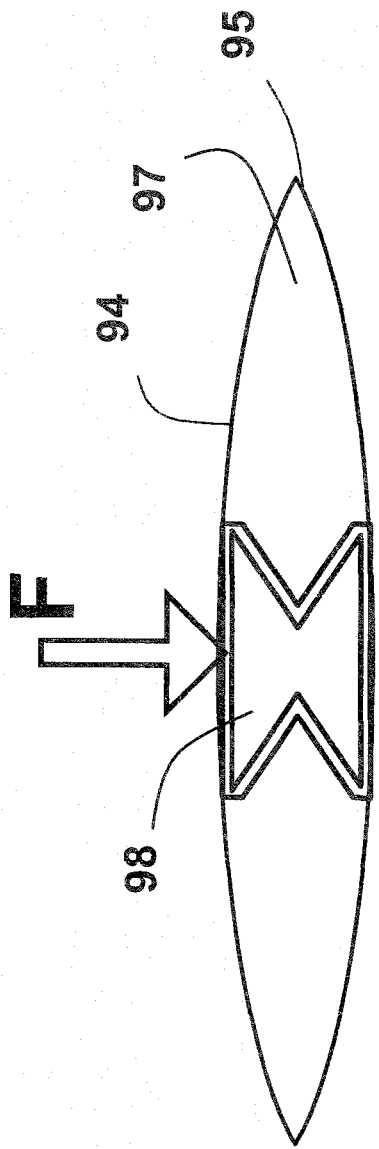

REPLACEABLE HEAT EXCHANGE CARTRIDGE EMPLOYED IN A HEAT EXCHANGE SYSTEM FOR TEMPERATURE CONTROL OF A PERISHABLE FLUID

CROSS-REFERENCE TO RELATED APPLICATIONS

This application is a U.S. 371 national phase entry of pending International Patent Application No. PCT/NL2012/050344, international filing date May 16, 2012, which claims priority to Dutch Patent Application No. NL2006826, filed May 20, 2011, the contents of which are incorporated by reference in their entireties.

The invention relates to a method for exchanging heat between a first fluid e.g. a heat exchange fluid and a second fluid e.g. a perishable product fluid, the method comprising:

providing the heat exchange fluid to an enclosure of a heat exchanger;

providing the perishable product fluid to a tube in the enclosure;

exchanging heat between the heat exchange fluid in the enclosure and the perishable product fluid in the tube;

interrupting providing the perishable product fluid to the tube.

Heat exchangers may be used for cooling, heating and/or energy recovery in, for example perishable product fluid streams. The heat exchanger may use the first fluid e.g. a heat exchange fluid to cool or heat the second fluid with, for example, a perishable product fluid such as for example coffee products, soup, sauces, diary products, chocolate, smoothies, juices, glucoses, ice cream or blood flowing trough the tube. Not excluding chemicals and other liquid products that might deteriorate in time under influence of temperature. During an interrupt of the method of exchanging heat the perishable product fluid that is left in the tube of the heat exchanger may suffer from quality loss.

Its an objective of the invention to provide an improved method for exchanging heat.

Accordingly there is provided a method for exchanging heat between a heat exchange fluid and a perishable product fluid, the method comprising:

providing the heat exchange fluid to an enclosure of a heat exchanger;

providing the perishable product fluid to a tube comprising a flexible portion in the enclosure;

exchanging heat between the heat exchange fluid in the enclosure and the perishable product fluid in the tube;

interrupting providing the perishable product fluid to the tube; and compressing the flexible portion of the tube to decrease a volume of the tube and to press a substantial part of the perishable product fluid out of the tube.

By compressing the flexible portion of the tube to decrease a volume of the tube and to press the perishable product fluid out of the tube the quantity of perishable product fluid in the tube may be lowered. This significantly decreases the risk that the fluid perishes e.g. loses quality.

According to a further embodiment of the invention there is provided a removable heat exchange cartridge for providing a temperature controlled perishable product fluid, the removable heat exchange cartridge being engageable with a base unit, the cartridge comprising a product fluid inlet for receiving the perishable product fluid, a product fluid outlet to provide the temperature controlled perishable product fluid, and a tube to supply the product fluid from the product fluid inlet to the product fluid outlet through an enclosure so as during use to exchange heat between a heat exchange fluid in the enclosure and the perishable product fluid in the tube, wherein the tube comprises a flexible portion with a flexibility such that the volume of the tube decreases if the flexible portion of the tube is compressed. By compressing the flexible portion of the tube to decrease a volume of the tube and to press the perishable product fluid out of the tube the quantity of perishable product fluid in the tube may be lowered. If nonetheless the removable heat exchange cartridge may be contaminated with some product fluid of less quality the heat cartridge may be replaced with another.

According to yet a further embodiment there is provided a heat exchange system comprising a base unit and the removable heat exchange cartridge, wherein the base unit comprises a base unit heat exchange outlet to engage with the heat exchange inlet of the heat exchange cartridge and a base unit heat exchange inlet to engage with the heat exchange outlet of the heat exchange cartridge to provide heat exchange fluid to the enclosure. If nonetheless the removable heat exchange cartridge may be contaminated with some product fluid of less quality the heat cartridge of the heat exchange system may be replaced with another.

According to yet a further embodiment there is provided a method for exchanging heat between a heat exchange fluid and a perishable product fluid, the method comprising:

providing the heat exchange fluid to an enclosure of a heat exchanger at a first temperature;

providing the perishable product fluid to a tube in the enclosure;

exchanging heat between the heat exchange fluid at the first temperature in the enclosure and the perishable product fluid in the tube;

interrupting providing the perishable product fluid to the tube;

changing the heat exchange fluid at a first temperature to a heat exchange fluid at a second temperature different from the first temperature;

providing the heat exchange fluid at a second temperature to the enclosure; and exchanging heat between the heat exchange fluid at the second temperature in the enclosure and the product fluid in the tube.

By changing the temperature of the heat exchange fluid in the heat exchanger the residue of the perishable product fluid in the tube may be kept longer good. The second temperature is a temperature where the product fluid is less likely to perish.

Embodiments of the invention will now be described, by way of example only, with reference to the accompanying schematic drawings in which corresponding reference symbols indicate corresponding parts, and in which:

FIGS. 4a and 4b depict a schematic representation of removable heat exchange cartridges according to further embodiments;

FIG. 5 depicts a schematic representation of an apparatus with a heat exchange system for dosing a perishable fluid for consumption;

FIGS. 6a and 6b depict a schematic representation of a heat exchange system according to yet a further embodiment; and, FIGS. 7a and 7b depict a cross section of a removable cartridge according to an embodiment.

Figure 1:
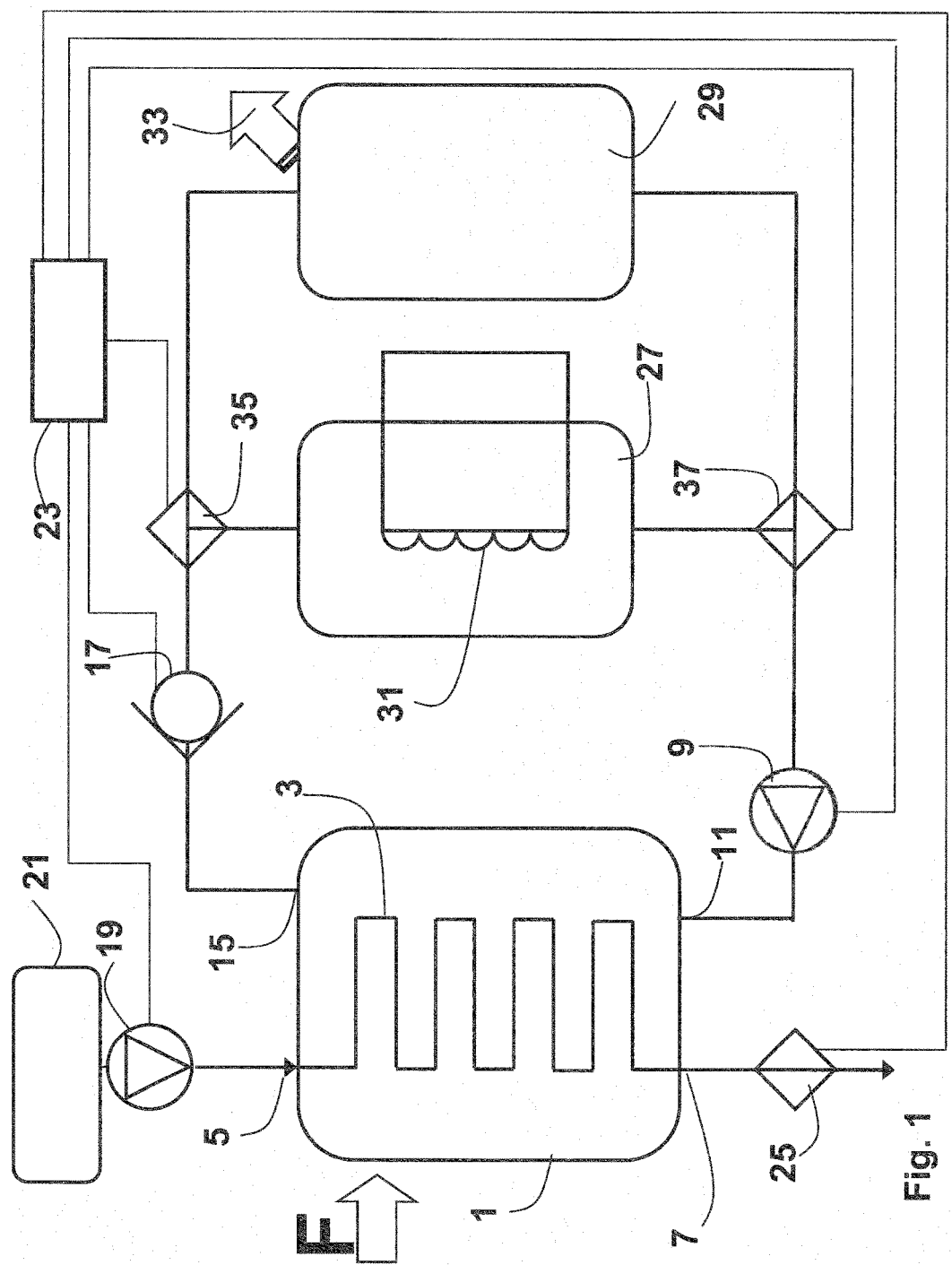
FIG. 1 depicts a schematic representation of a heat exchanger according to an embodiment.

FIG. 1 depicts a heat exchanger according to an embodiment of the invention. The heat exchanger comprises a flexible enclosure 1 and a flexible thin walled tube 3. The tube 3 may have any shape and length and has a contact surface enclosed within a flexible bag like enclosure 1. Both the tube 3 and the enclosure 1 may be manufactured from material that is flexible and substantially not permeable for liquids and/or gasses. The second fluid e.g. a perishable product fluid may be heated or cooled by the heat exchanger and is fed through the tube 3 via the inlet 5 and outlet 7. The heat exchanger may be provided with a control device to control a volume of the first fluid e.g. heat exchange fluid in the enclosure 1 to control the second fluid in the tube 3. For example, a volume of the second fluid in the tube 3 may be controllable by controlling the volume of the first fluid in the enclosure 1 by the control device. Further a flow or flow speed of the second fluid through the tube 3 may be controllable by controlling the volume of the first fluid in the enclosure 1 by the control device. The heat exchanger may have a combined function of exchanging heat between a first and a second fluid and of transporting or dosing the second fluid.

The control device may be provided with a first fluid pump 9 to pump the first fluid in or out of the enclosure 1 via the enclosure opening 11. The control device may be provided with a moveable press, which may function as an external force generator to press the first and/or second fluid out of the heat exchanger. The moveable press may be provided with, for example a press wheel which may be moveable over the exterior of the enclosure 1 so as to squeeze first and/or second fluids out of the heat exchanger. The press may comprise two surfaces which may be moved towards each other while the enclosure 1 is positioned in between the surfaces so that first and/or second fluids are squeezed out of the enclosure 1. The two surfaces of the press may be connected with a hinge. Alternatively a passive external force may be exerted to press the first and/or second fluid out of the heat exchanger. The heat exchanger may be provided with a spring or a memory material to exert the passive external force.

The enclosure 1 may be provided with a second opening 15 connected to a valve 17 for allowing the first fluid out the enclosure 1. The valve 17 may, optionally, be a one way valve. The tube 3 may be operable connected to a container 21. Under influence of an external pressure for example via pump 19 the second fluid may be pumped from the container 21 in the tube 3. The tube 3 may be provided within the enclosure 1 or may be extending along the outer perimeter of the enclosure 1. The control device may be provided with a controller 23 for controlling the volume of the first fluid in the enclosure 1. The controller 23 may be operable connected to the first fluid pump 9 so as to control pumping of the first fluid into the enclosure 1.

The first fluid pump 9 may be a two way pump and the valve 17 may be a one way valve which allows the first fluid flow out of the enclosure 1 and restricts the first fluid going back into the enclosure 1. The controller 23 may control the first fluid pump 9 to pump the first fluid into the enclosure 1 via the enclosure opening 11 and further via the second opening 15 and the valve 17 back. The pump 9, enclosure 1 and valve 17 may be part of a first fluid circuitry comprising a hot fluid storage 27 and/or a cold fluid storage 29. The controller 23 may be operable connected to the valve 17 to control its working.

The hot fluid storage 27 may be provided with a heater 31 to heat the first fluid in the hot fluid storage 27. The cold fluid storage 29 may be provided with a cooler 33 to remove heat from the first fluid in the cold fluid storage 29. The heater 31 and/or the cooler may be operable connected to, and controlled by the controller 23. The first fluid circuitry may comprise a valve 35 for directing the first fluid from the enclosure 1 to the hot fluid storage 27 or the cold fluid storage 29. The first fluid circuitry comprises a valve 37 for directing the first fluid from the hot fluid storage 27 or the cold fluid storage 29 to the enclosure 1 via an external pressure on the first fluid, for example generated by the first fluid pump 9. Further, external pressure, for instance created by the second fluid pump 19 may be controlled by the controller 23 to pump the second fluid into the tube 3 from the container 21 so as to allow heat to be exchanged between the first and second fluid. The second fluid will be delivered or dosed via the optional valve 25. The optional valve 25 and or the second fluid pump 19 may be operable connected to the controller 23. The controller may control the working of the optional valve 25 and or the second fluid pump 19.

If no more of the second fluid may be necessary, the dose may be adjusted and/or the container 21 may be empty, the second fluid pump 19 may be stopped by the controller 23. The controller 23 may change the direction of the first fluid pump 9 so that the first fluid in the enclosure 1 will be pumped out of the enclosure 1 via the enclosure opening 11. The one way valve 17 may restrict the flow of the first fluid back into the enclosure 1 from the first fluid circuitry and the volume of first fluid in the enclosure may decrease. An external pressure F, for example the atmospheric pressure F may decrease the size of the enclosure 1 if the first fluid is being removed which may result in a reduction of the volume of the second fluid in the tube 3 and a further flow of the second fluid out of the tube 3. This may be advantageously if the second fluid is a product which may deteriorate over time, if left in the tube. Spill may be reduced by removing the second fluid from the tube 3 and/or by cooling the second fluid in the tube 3 so that it is less likely to deteriorate. The energy efficiency may also be increased by removing first and second fluids from the heat exchanger because less hot or cold fluids are left in the enclosure 1 or the tube 3. If the heat exchanger will be changing from heating to cooling mode operation it is beneficial to remove much of the heat in the heat exchanger before cooling starts so that less heat needs to be removed from the heat exchanger before cooling may start. By exchanging first fluids, for instance from heating to cooling, new settings for the heat exchanger may be quickly chosen. The relative temperature of the first fluid with respect to the first fluid in the hot fluid storage 27 or the cold fluid storage 29 may determine whether the first fluid from the pump 9 will be flowing by the valve 37 to the hot fluid storage 27 or the cold fluid storage 29. The valves 35 and/or 37 may be operable connected to, and controlled by the controller 23.

The heat exchanger may be able to continuously heat and or cool the second fluid transported through the tube 3 by allowing it to exchange heat with the first fluid in the enclosure 1, surrounding the tube 3. When discontinuing the continuous operation mode by stopping the inlet of the second fluid into the tube 3, independently the first fluid may be removed from the heat exchanger in a controlled way. The second fluid still in the tube 3 may be pushed out of the heat exchanger by removing the first fluid from the enclosure 1, causing the tube 3 to compress in a controlled way. The second fluid may be pressed from the tube 3 of the heat exchanger in a controlled way and it may be possible to use the heat exchanger for dosing purposes.

When a volume of first and second fluids may be reduced from the heat exchanger, the heat content of the heat exchanger may be minimal allowing for very quick temperature adjustment of the heat exchanger itself, with minimal loss of energy. This may be supported by providing storage in storage 27 and 29 for the first fluid from the enclosure 1. This implicates that the circuitry for pumping the first fluid is open. Other solution is a closed system with an expansion vessel. The enclosure 1 may be provided with a venting valve to allow for air to be vented from the enclosure 1 when filling the enclosure. Also the tube 3 may be provided with a venting valve if necessary.

Figure 2:
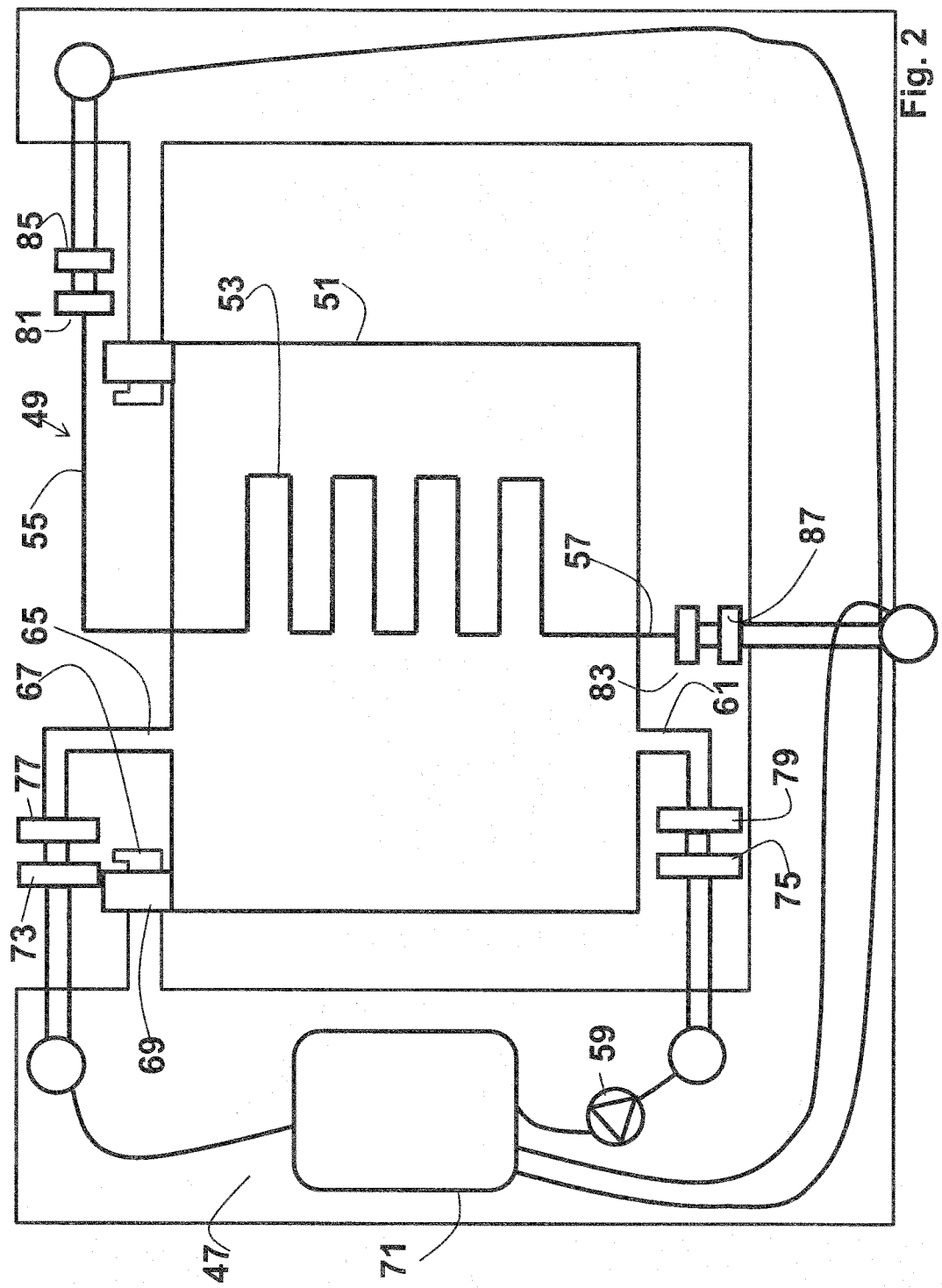
FIG. 2 depicts a schematic representation of a heat exchange system comprising a base unit and a removable heat exchange cartridge according to an embodiment.

FIG. 2 depicts a schematic representation of a heat exchange system comprising a base unit 47 and a removable heat exchange cartridge 49 according to an embodiment. The removable heat exchange cartridge 49 is being engageable with the base unit 47. The cartridge 49 comprises a product fluid inlet 55 for receiving the perishable product fluid, a product fluid outlet 57 to provide the temperature controlled perishable product fluid. There is a tube 53 to supply the product fluid from the product fluid inlet 55 to the product fluid outlet 57 through an enclosure 51 so as during use to exchange heat between a heat exchange fluid in the enclosure 51 and the perishable product fluid in the tube 53. The tube 53 may comprise a flexible portion with a flexibility such that the volume of the tube 53 decreases if the flexible portion of the tube is compressed. The enclosure 51 may be provided with an enclosure inlet 65, 77 to provide a heat exchange fluid to the enclosure 51 and an enclosure outlet 61, 79 for allowing a heat exchange fluid to exit the enclosure 51. The enclosure inlet 65, 77 is constructed and arranged for engagement with a base unit heat exchange fluid outlet 73 and the enclosure outlet 61, 79 is constructed and arranged for engagement with a base unit heat exchange fluid inlet 75.

The removable heat exchange cartridge 49 may comprise a flexible wall for the enclosure 51. By having a flexible wall the volume of the enclosure 51 may be varied and therefore the quantity of heat exchange fluid in the enclosure may be varied. The latter is advantageous if the working temperature of the heat exchanger is changed. The flexible portion of the tube 53 and the flexible wall of the enclosure 51 may have a flexibility such that the volume of the flexible portion of the tube 53 may decrease if the pressure in the enclosure 51 is decreased with respect to the pressure outside the enclosure causing the enclosure to shrink and compress the flexible portion to press substantially the perishable product out of the tube 53. In this way by decreasing the pressure in the enclosure the tube 53 may be compressed such that a substantial part of the perishable product fluid may be pressed out of the tube. Reducing the volume of the enclosure 51 and the tube 53 may be useful if the working temperature of the heat exchanger is changed. It may also be useful to prevent decay of the perishable product in the tube 53 of the heat exchange system.

The removable heat exchange cartridge 49 may be provided with an attaching mechanism 69 to removably engage the cartridge to a base unit 47 via the base unit attachment mechanism 67. As depicted the attaching mechanism may be provided to the enclosure 51 at the top side however alternatively it may be provided on the side of the enclosure 51.

The flexible portion of the tube 53 may have flexibility such that the volume of the flexible portion may decrease if the pressure in the enclosure 51 is larger than the pressure in the tube 53. In this way the flexible portion may be compressed to press a substantial part of the perishable fluid out of the tube 53 preventing decay of the perishable product in the tube 53

The flexible portion of the tube may be used for dosing the perishable product fluid. This may be useful if, for example the tube will be substantially emptied by compressing the tube 53. The volume of the flexible portion of the tube may therefore have a volume which is smaller or equal to one dose so that it may be possible to substantially empty the tube by serving one dose. Waste may be minimized at an interrupt of the fluid by substantially emptying the tube while serving a last dose.

The tube 53 may be connected to perishable product fluid inlet 55 and a tube connector 81 to provide the perishable product to the tube 53. The base unit perishable product fluid outlet 85 may be engageable to the tube connector 81 to provide the perishable product fluid from the base unit 47 to the tube 53. From the tube 53 the perishable product fluid may be provided via product fluid outlet 57 and the product outlet connector 83 to a base unit product inlet connector 87. The perishable product fluid may also be directly poured in a container from the product fluid outlet 57. Optionally via a closing valve (not shown).

The base unit 47 may be provided with a pump 59 and/or a valve to control the quantity and/or the pressure of the heat exchange fluid in the enclosure 51 so as to control the quantity of the product fluid in the tube 53. The base unit may have a control device 71 connected to the pump and/or the valve to control the timely dosing of the perishable product fluid and the volume of the flexible portion of the tube 53 in the enclosure 51 by controlling the provision of heat exchange fluid from the base unit to the heat exchange cartridge 49. The base unit 47 may comprises a heat storage to store a relatively hot heat exchange fluid and a cold storage to store a relatively cold heat exchange fluid. The control device may be programmed to control an exchange of relatively hot heat exchange fluid in the enclosure with relatively cold heat exchange fluid in the enclosure, and/or vice versa. The control device may be connected to the pump. For more details with respect to the above mentioned items reference is made to FIG. 1 for the control device 23, the pump 9, the valve 17 and the heat and cold storage 27, 29 respectively. The base unit 47 may comprise a control device 71 connected to the pump 59 and/or the valve to control interrupting providing the perishable product fluid to the tube 53 in the enclosure 51.

During use of the heat exchange system, heat between a heat exchange fluid and a perishable product fluid will be exchanged by a method comprising:

providing the heat exchange fluid to an enclosure 51 of a heat exchanger;

providing the perishable product fluid to a tube 53 comprising a flexible portion in the enclosure 51;

exchanging heat between the heat exchange fluid in the enclosure and the perishable product fluid in the tube 53;

interrupting providing the perishable product fluid to the tube 53; and compressing the flexible portion of the tube 53 to decrease a volume of the tube and to press a substantial part of the perishable product fluid out of the tube 53. By compressing the flexible portion of the tube to decrease a volume of the tube and to press the perishable product fluid out of the tube the quantity of perishable product fluid in the tube may be lowered. First, providing the perishable product fluid will be interrupted, secondly the flexible portion of the tube will be compressed.

Compressing the flexible portion of the tube may comprise decreasing the quantity of the heat exchange fluid in the enclosure causing the enclosure to shrink and compress the flexible portion of the tube. Compressing the flexible portion of the tube may comprise increasing the quantity of the heat exchange fluid in the enclosure and shrink the flexible portion of the tube. In both cases rather simple mechanisms are used to compress the flexible portion of the tube 53. A pump and some valves may be sufficient to accomplish this.

Compressing the flexible portion of the tube 53 may comprise increasing the pressure of the heat exchange fluid in the enclosure and shrink the flexible portion of the tube. The latter may be done with a relatively inflexible enclosure 51. Compressing the flexible portion of the tube 53 may also comprise decreasing the pressure of the heat exchange fluid in the enclosure causing the enclosure to shrink and compress the flexible portion of the tube. Since a pump may already be used for the heat exchange liquid decreasing the pressure may be done with said pump. Alternatively an external force may be used to decrease a volume of the tube and to press the perishable product fluid out of the tube. Compressing the flexible portion of the tube may be used for dosing the perishable product fluid.

During use of the heat exchange system the method for exchanging heat between a heat exchange fluid and a perishable product fluid may comprise:

providing the heat exchange fluid to an enclosure of a heat exchanger at a first temperature;

providing the perishable product fluid to a tube in the enclosure;

exchanging heat between the heat exchange fluid at the first temperature in the enclosure and the perishable product fluid in the tube;

interrupting providing the perishable product fluid to the tube;

changing the heat exchange fluid at a first temperature to a heat exchange fluid at a second temperature different than the first temperature;

providing the heat exchange fluid at a second temperature to the enclosure; and exchanging heat between the heat exchange fluid at the second temperature in the enclosure and the residue of the product fluid in the tube. By changing the temperature of the heat exchange fluid in the heat exchanger the perishable product fluid in the tube may be kept longer good. The method may be used in combination with compressing the flexible portion of the tube in the enclosure or may be used independently. The second temperature may be a temperature at which the perishable product is less sensitive to decay than the first temperature. As an example the product fluid can be cooled to a temperature where decay does not occur anymore or the product fluid can be heated to such a temperature where for instance bacteria growth does not take place anymore. In this way the perishable product fluid in the tube may be kept longer good. A volume of perishable product fluid in the tube may be minimized by compressing a flexible portion of the tube after interrupting providing the perishable product fluid to the tube. The perishable product may comprise one or more of coffee products, soup, sauces, diary products, chocolate, smoothies, juice, glucoses, ice cream and blood. The method may comprise dosing the perishable product fluid by compressing the flexible portion of the tube. The heat exchanger may be a removable heat exchange cartridge and the method comprises removing the removable heat exchange cartridge from a base unit.

Figure 3:
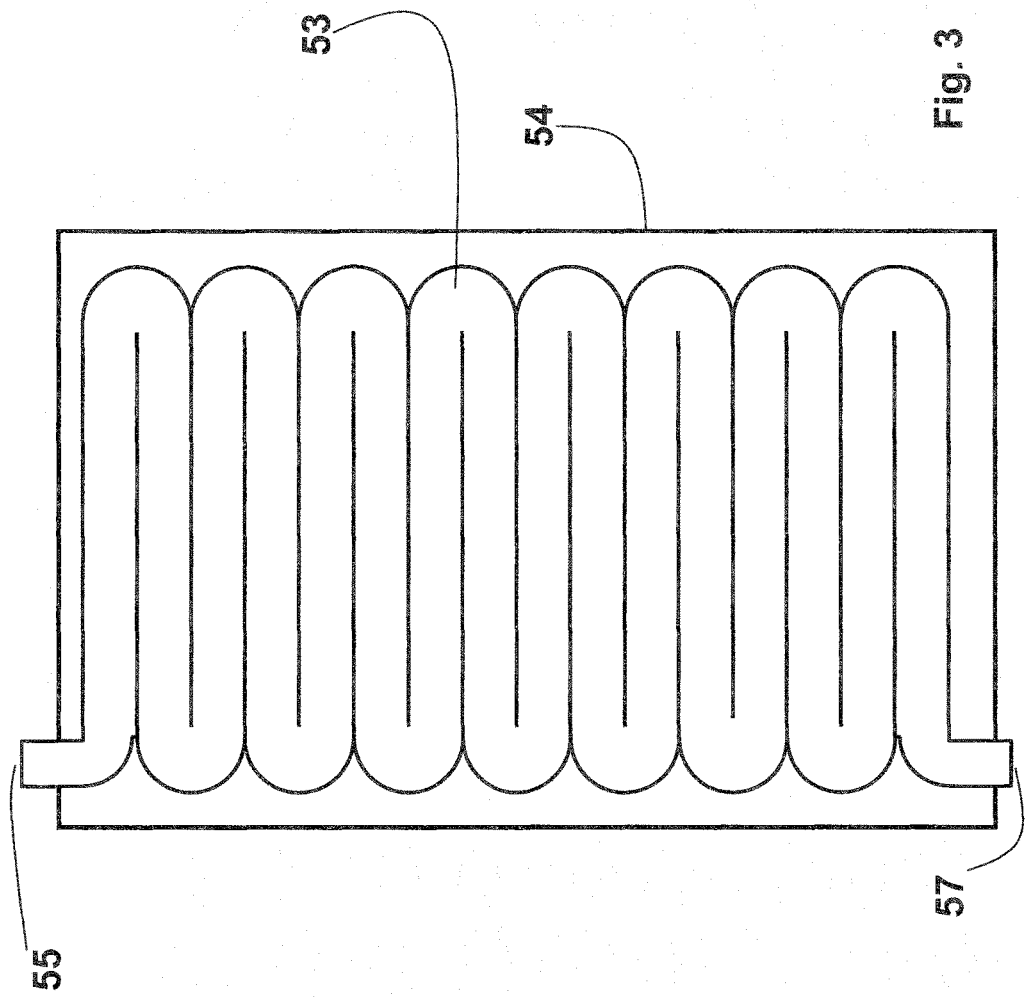
FIG. 3 depicts a schematic representation of a tube with a flexible portion for use in the heat exchanger.

FIG. 3 depicts a schematic representation of a tube 53 with a flexible portion for use in the heat exchanger cartridge. The tube is provided with a tube inlet 55 and a tube outlet 57. The tube may be provided with bends in a labyrinth shape so as to optimize the heat exchange. The tube may be made from a food or medical approved, rubber, silicone, or plastic, for example. The plastic product may be polypropylene or polyethylene. The tube 53 may be made out of two plastic foils 54. The tube may also be created by providing two foils on top of each other and partially joining the two foils so as to create the tube between the foils and the place where the foils are joined. The latter may, for example be done by joining or welding the two foils along two lines whereby the tube is created in between the lines. The heat exchange cartridge may be biodegradable.

FIG. 4a depicts a schematic representation of a removable heat exchange cartridge according to further embodiment. The tube 55 is provided in between two foils 54 and provided within the enclosure 51. The perishable product fluid is flowing from the product fluid inlet 55 to the product fluid outlet 57. The heat exchange fluid is flowing in generally the same direction from enclosure inlet 65 to enclosure outlet 61. The general direction of both may be from up to down such that the flow of both is supported by gravity.

FIG. 4b depicts a schematic representation of a removable heat exchange cartridge according to further embodiment. The tube 55 is provided in between two foils 54 and provided within the enclosure 51. The perishable product fluid is flowing from the product fluid inlet 55 to the product fluid outlet 57. The heat exchange fluid is flowing in generally in the counter direction from enclosure inlet 65 to enclosure outlet 61. Providing the heat exchange fluid in counter flow with respect to the product fluid is more energy efficient because of a more constant delta temperature.

FIG. 5 depicts an example of a schematic representation of an apparatus with a heat exchange system for dosing a perishable liquid for consumption. The apparatus is provided with a storage space 21 for storing the perishable product fluid and via the base unit perishable product fluid outlet 85 which may be engageable to the tube inlet 81 the perishable product fluid may be provided to tube 53 of the removable heating cartridge 49. From the tube 53 the perishable product fluid may be provided to a drinking cup 70 via the product fluid outlet 57. Optionally, via a closing valve (not shown) in the product fluid outlet 57.

Heat may be exchanged with the perishable product fluid by having an enclosure inlet 65 to provide a heat exchange fluid to the enclosure 51 and an enclosure outlet 61 for allowing a heat exchange fluid to exit the enclosure 51. The enclosure inlet 65 is constructed and arranged for engagement with a base unit water outlet and the enclosure outlet 61 is constructed and arranged for engagement with a base unit water inlet (not shown).

If dosing perishable product fluids in the drinking cup 70 is interrupted by the controller it is advantageous to empty the tube 53. The tube 53 may therefore comprise a flexible portion with flexibility such that the volume of the tube 53 decreases if the flexible portion of the tube is compressed. Compressing the flexible portion of the tube may be accomplished by decreasing the quantity of the heat exchange fluid in the enclosure causing a flexible enclosure to shrink and compress the flexible portion of the tube. After substantially emptying the tube 53 and the enclosure 51 the temperature in the removable heat exchange cartridge 49 may be changed to a temperature in which the residue of the perishable product fluid in the tube may suffer from less decay. The temperature of the heat exchange liquid and the residue of the perishable product fluid in the tube may be changed. For example, if the perishable product fluid may be consumed hot the perishable product fluid may suffer less decay if it is cooled to relatively low temperatures (e.g. lower than 7 degrees Celcius, which temperature is depending on the tendency to perish of the product fluid). If the interruption is very long (e.g. 1 day which period is depending on the tendency to perish of the product fluid) the heat exchange cartridge may anyway get contaminated with the residue of the perishable product fluid. The removable heat exchange cartridge may therefore be removed from the base unit 47 of the apparatus. The heat exchange cartridge is for this purpose provided with attaching mechanism 69 to removably engage the cartridge to a base unit 47 via the base unit attachment mechanism 67. A clean removable heat exchange cartridge 49 may later on be positioned in the base unit 47 after the interruption has ended. The base unit perishable product fluid outlet 85 may be connected to the new heat exchange cartridge and the enclosure inlet 65 and the enclosure outlet 61 may be connected to the heat exchange system.

Alternatively, one may clean the heat exchange cartridge by flushing the tube with water. The flushing may be done in place or the cartridge may be removed for flushing.

FIGS. 6a and 6b depict a schematic representation of a heat exchange system according to yet a further embodiment. The apparatus is provided with a storage space 21 for storing the perishable product fluid and via the perishable product fluid pump 19 the perishable product fluid may be provided to tube 53 of the removable heating cartridge 49. From the tube 53 the perishable product fluid may be provided to a container not shown via the product fluid outlet 57. Via the pipe 60 a heat exchange fluid may be provided via the enclosure inlet 65 to the enclosure 51. The heat exchange fluid may via enclosure outlet 61 be pumped away with pump 59.

The base unit may be provided with a contact member with a surface constructed and arranged to contact with an outside wall of the enclosure 51 of the cartridge 49 and the surface of the contact member is deformable so to change the shape of the enclosure of the removable heat exchange cartridge 49. This may be done by having a stationary first plate 89 with openings and a movable push member 91 for providing pins through the holes to change the shape of the enclosure 51. The push member may be moved against the enclosure 51 to alter the hydrodynamic properties of the enclosure 51 from laminar (in FIG. 6a) to turbulent (in FIG. 6b). One may change the heat exchange fluid at a first temperature to a heat exchange fluid at a second temperature different than the first temperature without emptying the enclosure 51. When changing from cold to hot temperatures it is advantageous to bring the relatively warm heat exchange fluid on top of the colder heat exchange fluid to avoid mixing. When changing from hot to cold temperatures it is advantageous to bring the relatively cold heat exchange fluid below the hot heat exchange fluid to avoid mixing. In that case it may be useful to have laminar hydrodynamic properties in the enclosure so that for example hot water may be provided on top via enclosure inlet 65, while at the same time the relatively cold heat exchange fluid is pumped away via the water outlet 61. Since the water behaves laminar there will not be much mixing between the relatively hot and cold water. During exchanging heat between the heat exchange fluid at the first temperature in the enclosure and the perishable product fluid in the tube it may be useful to have turbulence in the enclosure 51 to enhance the heat transfer between the fluid in the enclosure 51 and the perishable product fluid in the tube 53.

FIG. 7a depicts a cross section of a removable cartridge according to an embodiment. The removable heat exchange cartridge is provided with an enclosure with a wall comprising two relatively inflexible wall parts 94 connected with relatively flexible wall portions 95. The flexible portion 93 of the tube is at least partially located between the inflexible wall portions 94. By reducing the pressure in the interior 96 of the enclosure or increasing the pressure on the inflexible wall parts 94 from outside the flexible portion 93 of the tube may be compressed between the relatively inflexible wall portions 94 to decrease a volume of the tube and to press a substantial part of the perishable product fluid out of the tube.

FIG. 7b depicts a cross section of a removable cartridge according to an embodiment. The removable heat exchange cartridge is provided with an enclosure with a wall comprising two relatively inflexible wall parts 94 connected with relatively flexible wall portions 95. The flexible portion 98 of the tube is at least partially located between the inflexible wall portions 94. By reducing the pressure in the interior 97 of the enclosure the tube 98 may be compressed and folded between the relatively inflexible wall portions 94 to decrease a volume of the tube and to press a substantial part of the perishable product fluid out of the tube.

It is to be understood that the disclosed embodiments are merely exemplary of the invention, which can be embodied in various forms. Embodiments may be further described by the following clauses:

1. A heat exchanger for exchanging heat between a first and a second fluid, the heat exchanger comprising an enclosure provided with a tube wherein the enclosure and the tube are flexible and the heat exchanger is provided with a control device to control a volume of the first fluid in the enclosure to control the second fluid in the tube.

2. The heat exchanger according to clause 1, wherein a volume of the second fluid in the tube is controllable by controlling the volume of the first fluid in the enclosure with the control device.

3. The heat exchanger according to clause 1, wherein a flow of the second fluid through the tube is controllable by controlling the volume of the first fluid in the enclosure by the controlling device.

4. The heat exchanger according to any of the preceding clauses, wherein the control device is provided with a first fluid pump to pump the first fluid in or out of the enclosure.

5. The heat exchanger according to clause 1, wherein the control device is provided with an external force generator to press the first and/or second fluid out of the heat exchanger.

6 The heat exchanger according to clause 5, wherein the external force generator is a moveable press constructed and arranged to press the first and/or second fluid out of the heat exchanger.

7. The heat exchanger according to any of clauses 1-4, wherein a passive external force is exerted to press the first and/or second fluid out of the heat exchanger.

8. The heat exchanger according to clause 7, wherein the heat exchanger is provided with a spring or a memory material to exert the passive external force.

9. The heat exchanger according to any of the preceding clauses, wherein the enclosure is provided with a second opening connected to a valve for allowing the first fluid in or out of the enclosure.

10. The heat exchanger according to any of the preceding clauses, wherein the tube is connected via a second fluid pump to a container to pump the second fluid from the container in the tube.

11. The heat exchanger according to any of the preceding clauses, wherein the tube is provided within the enclosure.

12. The heat exchanger according to any of the preceding clauses, wherein the control device is provided with a controller for controlling the volume of the first fluid in the enclosure.

13. The heat exchanger according to any of the preceding clauses, wherein the heat exchanger is constructed and arranged to reduce a volume of the second fluid in the tube by removing the first fluid from the enclosure.

14. The heat exchanger according to any of the preceding clauses, wherein the enclosure is part of a fluid circuitry comprising a hot fluid storage and/or a cold fluid storage.

15. The heat exchanger according to clause 14, wherein the fluid circuitry comprises a valve for directing the first fluid from the enclosure to the hot fluid storage or the cold fluid storage.

16. The heat exchanger according to clause 14, wherein the fluid circuitry comprises a valve for directing the first fluid from the hot fluid storage or the cold fluid storage to the enclosure.

17. The heat exchanger according to any of the preceding clauses, wherein the tube is connected to a valve for letting the second fluid out of the tube.

18. A method of exchanging heat between a first and a second fluid comprising:
providing the first fluid to an enclosure;
providing the second fluid to a tube provided to the enclosure so as to allow heat to be exchanged between the first fluid in the enclosure and the second fluid in the tube; and,
controlling the second fluid by controlling a volume of the first fluid in the enclosure.

19. The method according to clause 18, wherein controlling the fluid comprises controlling a volume of the second fluid in the tube.

20. The method according to clause 18 or 19, wherein the method comprises
providing the first fluid at a first temperature to the enclosure;
reducing the volume of the first fluid in the enclosure; and,
providing the first fluid at a second temperature different than the first temperature to the enclosure and increase the volume of the first fluid in the enclosure.

21. The method according to clause 20, comprising reducing a volume of the second fluid in the tube by reducing the volume of the first fluid in the enclosure.

22. The method according to clause 20 or 21, wherein the first fluid at a first temperature is received from a heat storage and the first fluid at a second temperature is received from a cold storage or vice versa.

23. The method according to clause 18, wherein controlling the second fluid by controlling the volume of the first fluid in the enclosure comprises dosing the second fluid.

Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

The invention claimed is:

1. A method for exchanging heat between a heat exchange fluid and a perishable liquid for consumption, the method comprising:
providing a base unit comprising a base unit heat exchange inlet and a base unit heat exchange outlet;
providing a replaceable heat exchange cartridge comprising an enclosure and a tube, the enclosure comprising a heat exchange enclosure inlet and a heat exchange enclosure outlet, the tube comprising a flexible portion in the enclosure, wherein the replaceable heat exchange cartridge is configured for removal from the base unit and engagement with the base unit;
engaging the base unit heat exchange outlet to the heat exchange enclosure inlet of the cartridge
engaging the base unit heat exchange inlet with the heat exchange enclosure outlet of the cartridge;
providing the heat exchange fluid to the enclosure of the cartridge via the base unit heat exchange outlet and the heat exchange enclosure inlet of the cartridge;
providing the perishable liquid for consumption to the tube;
exchanging heat between the heat exchange fluid in the enclosure and the perishable liquid for consumption in the tube;
allowing the heat exchange fluid to exit the enclosure of the cartridge via the heat exchange enclosure outlet and the base unit heat exchange inlet;
interrupting the flow of the perishable liquid for consumption to the tube;
compressing the flexible portion of the tube to decrease a volume of the tube and to press a majority of the perishable liquid for consumption out of the tube; and
removing the replaceable heat exchange cartridge from the base unit and replacing the heat exchange cartridge with another heat exchange cartridge.

2. The method according to claim 1, wherein compressing the flexible portion of the tube comprises adjusting the volume of the enclosure by adjusting the quantity of heat exchange fluid in the enclosure.

3. The method according to claim 2, wherein adjusting the volume of the enclosure comprises decreasing the quantity of the heat exchange fluid in the enclosure causing the enclosure to shrink and compress the flexible portion of the tube.

4. The method according to claim 2, wherein adjusting the volume of the enclosure comprises increasing the quantity of the heat exchange fluid in the enclosure causing the flexible portion of the tube to shrink.

5. The method according to claim 1, wherein compressing the flexible portion of the tube comprises increasing the pressure of the heat exchange fluid in the enclosure causing the flexible portion of the tube to shrink.

6. The method according to claim 1, wherein compressing the flexible portion of the tube comprises decreasing the pressure of the heat exchange fluid in the enclosure causing the enclosure to shrink and causing the flexible portion of the tube to compress.

7. The method according to claim 1, wherein compressing the flexible portion of the tube comprises compressing the heat exchanger with an external force to decrease a volume of the tube and to press the perishable liquid for consumption out of the tube.

8. The method according to claim 1, wherein the method comprises dosing the perishable liquid for consumption by compressing the flexible portion of the tube.

9. The method according to claim 1, wherein the method comprises:
   providing the heat exchange fluid to the enclosure at a first temperature;
   providing the perishable liquid for consumption to the tube in the enclosure;
   exchanging heat between the heat exchange fluid at the first temperature in the enclosure and the perishable liquid for consumption in the tube;
   interrupting providing the perishable liquid for consumption to the tube;
   compressing the flexible portion of the tube to decrease a volume of the tube and to press a majority of the perishable liquid for consumption out of the tube; and
   providing the heat exchange fluid at a second temperature different from the first temperature to the enclosure to allow heat to be exchanged between the heat exchange fluid in the enclosure and residue of the perishable liquid for consumption in the tube.

10. A heat exchange system for providing a temperature controlled perishable liquid for consumption, the system comprising:
   a base unit having a base unit heat exchange inlet and a base unit heat exchange outlet;
   a replaceable heat exchange cartridge being engageable with the base unit, wherein said replaceable heat exchange cartridge further comprises:
      an enclosure having a heat exchange enclosure inlet and a heat exchange enclosure outlet;
      the heat exchange enclosure inlet engageable with the base unit heat exchange outlet to provide a heat exchange fluid to the enclosure;
      the heat exchange enclosure outlet engageable with the base unit heat exchange inlet to allow the heat exchange fluid to exit the enclosure;
      a product fluid inlet for receiving the perishable liquid for consumption;
      a product fluid outlet to provide the temperature controlled perishable liquid for consumption; and
      a tube to supply the perishable liquid for consumption from the product fluid inlet to the product fluid outlet through the enclosure so as during use to exchange heat between the heat exchange fluid in the enclosure and the perishable liquid for consumption in the tube, and wherein the tube comprises a flexible portion, wherein the flexible portion is configured such that a volume of the tube decreases in size upon compression of the tube,
   wherein the replaceable heat exchange cartridge is configured for removal from said base unit,
   wherein the replaceable heat exchange cartridge is configured for engagement with said base unit.

11. The heat exchange system according to claim 10, wherein the enclosure comprises a flexible wall.

12. The heat exchange system according to claim 10, wherein the flexible portion of the tube and a flexible wall of the enclosure have a flexibility such that the volume of the flexible portion of the tube is configured to decrease upon a decrease in pressure in the enclosure resulting from pressure outside the enclosure causing the enclosure to shrink and compress the flexible portion to press the perishable liquid for consumption out of the tube.

13. The heat exchange system according to claim 10, wherein the enclosure is provided with a wall comprising two inflexible wall parts connected with flexible wall portions and the flexible portion of the tube is at least partially located between the inflexible wall parts.

14. The heat exchange system according to claim 10, wherein the base unit comprises a contact member with a surface configured to contact an outside wall of the enclosure of the removable heat exchange cartridge, wherein the surface of the contact member is movable as to change the shape of the enclosure of the removable heat exchange cartridge.

15. The heat exchange system according to claim 10, wherein the base unit comprises a pump and/or a valve to control the quantity and/or the pressure of the heat exchange fluid in the enclosure as to control the quantity of the product fluid in the tube.

16. The heat exchange system according to claim 15 wherein the base unit comprises a controller connected to the pump or the valve to control the timely dosing of the perishable liquid for consumption and the volume of the flexible portion of the tube in the enclosure by controlling the provision of the heat exchange fluid from the base unit to the heat exchange cartridge.

17. The heat exchange system of claim 10, wherein said perishable liquid is a dairy product.

18. The heat exchange system of claim 10, wherein said heat exchange system provides heat exchange fluid at a first temperature and a second temperature different from said first temperature.

* * * * *